United States Patent [19]

Fox

[11] 3,927,072

[45] Dec. 16, 1975

[54] FLUORINATED β-(ALKOXY)-PROPIONATES

[75] Inventor: Adrian Samuel Fox, Lower Providence, Pa.

[73] Assignee: Pennwalt Corporation, Philadelphia, Pa.

[22] Filed: Feb. 4, 1974

[21] Appl. No.: 439,510

[52] U.S. Cl.......... 260/484 R; 252/48.6; 260/465.6; 260/535 H
[51] Int. Cl.²........................................ C07C 69/66
[58] Field of Search..................... 260/484 R, 535 A

[56] References Cited
UNITED STATES PATENTS 3,678,068 7/1972 Anello............................ 260/484 R Primary Examiner—Lorraine A. Weinberger
Assistant Examiner—Paul J. Killos

[57] ABSTRACT

Fluorinated β-(alkoxy)-propionitriles of the structure

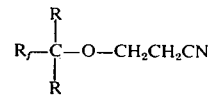

are good solvents for high molecular weight polymers. The corresponding acids of the nitriles are surfactants, and the esters of the acid with aliphatic polyols are lubricant fluids.

9 Claims, No Drawings

FLUORINATED β-(ALKOXY)-PROPIONATES

This invention concerns new fluorinated β-(alkoxy) propionitriles, the acid analogs and ester derivatives thereof.

The compounds of this invention are represented by the structure

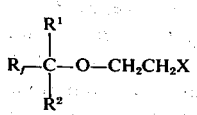

wherein $R_f$ is $CF_3$, $CF_3CFHCF_2$, or $H(CF_2CF_2)_n$ where $n$ is an integer of 1 to 3; $R^1$ and $R^2$ are independently hydrogen or $CH_3$; and X is $$CN, \overset{O}{\underset{}{C}}OH, \text{ or } \overset{O}{\underset{}{C}}OR^3$$

where $R^3$ is alkyl or alkylene having from 1 to 8 carbon atoms, preferably lower alkyl or lower alkylene, i.e., having from 1 to 4 carbon atoms.

The fluorinated β-(alkoxy)-propionitriles embodied herein are prepared by reaction of acrylonitrile in the presence of a basic catalyst with a fluorinated alcohol precursor (of the formula

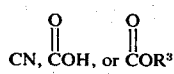

wherein $R_f$, $R^1$ and $R^2$ are as defined above) using methods described in the literature relative to the reaction of acrylonitrile with hydrocarbon alcohols, for example, the methods of Bruson and Adams, Organic Reactions, Vol. 5, p. 79 et seq. (1949); Maeker and Kenney, U.S. Pat. No. 3,701,802; MacGregor and Pugh, J. Chem. Soc. (London), 1949, pp. 535–536; and Japanese Pat. No. 5792/55 (C.A. Vol. 52, 5881).

The following examples illustrate the preparation of the fluorine-containing propionitriles embodied herein by cyanoethylation of fluorinated alcohols.

EXAMPLE 1

Synthesis of β-(hexafluorobutoxy)-propionitrile, Benzyltrimethylammonium hydroxide Method A dry, 100 ml 3-necked round bottom flask, fitted with a nitrogen inlet, a reflux condenser and "Drierite" filled drying tube, a magnetic stirrer and a rubber serum cap addition port, is purged with nitrogen and charged with 39.9 g (0.75 mole) of acrylonitrile, technical grade, and 3.15 g (0.017 mole) of 2,2,3,4,4,4-hexafluorobutan-1-ol. The stirred light yellow solution is cooled to 5°C with an ice/water bath and 0.75 cc of 40% benzyltrimethylammonium hydroxide in methanol is added rapidly. After 40 minutes the yellow color becomes more intense. After 3 hours the reaction mixture is poured into a rapidly stirred mixture of 50 ml of deionized water, 100 cc of $CF_2ClCCl_2F$ solvent, and 5 drops of concentrated hydrochloric acid.

The β-(hexafluorobutoxy)-propionitrile,

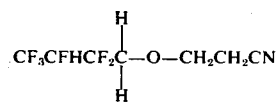

is recovered from the halogenated solvent in good yield (65% conversion of the hexafluorobutanol).

EXAMPLE 2

Synthesis of β-(hexafluorobutoxy)-propionitrile, Potassium Hydroxide Method

A 250 ml round bottom 3-necked flask, fitted with an equilibrating dropping funnel, nitrogen inlet, magnetic stirrer, thermometer, and reflux condenser and Drierite filled drying tube, is cooled to 0°C and charged with 150 g (0.82 mole) of hexafluorobutanol and 0.87 g (0.013 mole-85% pure) of potassium hydroxide. The stirred mixture is warmed to 50°C to effect complete solution. The stirred solution is cooled to 20°C, and 43.7 g (0.82 mole) of acrylonitrile, technical grade, is added dropwise over a 45 minute period. The reaction mixture is stirred at room temperature for an additional 30 minutes and then heated to 110°C with little or no refluxing. The slightly cloudy reaction mixture is cooled to 5°C, and 2.75 g (0.015 mole) of p - toluene-sulfonic acid monohydrate is added. After stirring overnight at room temperature, the reaction mixture is filtered and the filtrate distilled under vacuum to obtain 104 g (54% yield) of β-(hexafluorobutoxy)-propionitrile, boiling point, 55°C. at 0.28 mm Hg. The refractive index of the compound is measured as $n_D^{25}$ 1.3514.

Elemental Analysis: C, 36.00; H, 2.78; N, 5.76; F, 50.64%. Calcd. for $C_7F_6H_7NO$: C, 35.76; H, 3.00; N, 5.96; F, 48.49%.

EXAMPLE 3

Synthesis of β-(hexafluorohexoxy)-propionitrile

Using the equipment and procedure described in the previous example, 150 g (0.71 mole) of hexafluorohexanol (2-methyl-3,3,4,5,5,5-hexafluoropentane-2-ol) is reacted with 0.77 g (0.013 mole - 85% pure) potassium hydroxide and 37.8 g (0.71 mole) of acrylonitrile added dropwise to the reaction mixture at 80°–82°C over 1.5 hours. After stirring an additional hour, the reaction mixture is cooled to 20°C and 2.75 g (0.015 mole) of p-toluene-sulfonic acid monohydrate is added. The slurry is stirred at room temperature overnight. The reaction mixture is worked-up as in the previous example to yield β-(hexafluorohexoxy)-propionitrile,

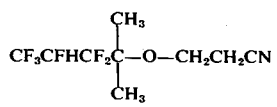

(17% conversion of hexafluorohexanol).

The fluorinated β-(alkoxy)-propionitrile embodied herein is useful as a solvent at room temperature for polymethyl methacrylate, and as a solvent at elevated temperatures for polyvinyl fluoride, vinylidene fluoride homopolymer, the copolymer of vinylidene fluoride and tetrafluoroethylene, various vinylidene fluoride copolymer elastomers, and polycarbonates, thus giving the propionitrile utility in the application of coatings to substrates of such high-molecular weight polymers from solvent systems. This use is facilitated by the high dielectric constant of the fluorinated β-(alkoxy)-propionitrile compared to the non-fluorinated counterpart.

The fluorinated β-(alkoxy)-propionitriles may be hydrolyzed under acidic conditions to the corresponding β-(alkoxy)-propionic acids and esters, i.e., where X is COOH or COOR³ in the formula set forth earlier. The following example illustrates a typical preparation of a representative propionic acid.

EXAMPLE 4

Synthesis of β-(hexafluorobutoxy)-propionic Acid

A rapidly stirred mixture of 235 g (1.0 mole) of β-(hexafluorobutoxy)-propionitrile and 120 ml (1.4 moles) of concentrated hydrochloric acid is heated to reflux in a 500 ml round bottom flask fitted with a reflux condenser. After 3 hours, an additional 50 ml of concentrated hydrochloric acid is added to the reaction mixture and refluxing is continued for an additional 14 hours. The reaction mixture is cooled to 15°C, filtered, and the filtrate diluted with an equal volume of water and extracted with two 200 ml portions of $CF_2ClCCl_2F$ solvent. The solutions are combined and extracted with 2 × 500 ml of cold 10 wt. % aqueous sodium carbonate. The solvent solution is then dried over anhydrous sodium sulfate and distilled to yield 59.8 g of unhydrolyzed β-(hexafluorobutoxy)-propionitrile.

The combined carbonate solutions are acidified with concentrated hydrochloric acid to about pH2 (Alkacid Test Paper) and extracted with 2 × 300 ml of $CF_2ClCCl_2F$ solvent. The combined extracts are dried over anhydrous sodium sulfate and distilled at reduced pressure to yield 148 g (78% conversion) of β-(hexafluorobutoxy)-propionic acid,

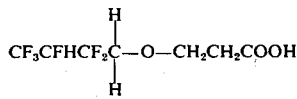

Boiling Point: 75°C at 0.13 mm Hg; Index of refraction: $n_D^{25}$ 1.3576

Elemental Analysis: C, 33.16; H, 3.19; F, 43.9%.

Calcd. for $C_7H_8F_6O_3$: C, 33.09; H, 3.17; F, 44.9%.

The surface tension of a 0.09 molar solution of the acid in a 1:1 mixture of water and isopropanol is 24.4 dynes/cm.

The fluorinated β-(alkoxy)-propionic acids and simple esters thereof embodied herein are readily converted to the simple salts of the acid, e.g., alkali metal and ammonium salts, which, as are the acids, good surfactants in aqueous media.

The compounds of this invention, i.e., the fluorinated β-(alkoxy)propionic acids and simple esters thereof, are readily converted into the complex esters of aliphatic polyols using acid-catalyzed esterification techniques such as disclosed by P. D. Faurote et al., Ind. Eng. Chem., 48, 445 (1956) and L. W. Breed et al., Ind. Eng. Chem. Prod. Res. Develop., 11 (1), 88 (1972). These esters of the novel propionic acid with a polyol, for example, an aliphatic polyol having from 4 to about 10 carbon atoms and 2 to 4 hydroxy groups, and preferably a glycol, are excellent lubricant fluids, having particularly good lubricating properties in extreme temperature ranges, especially at low temperatures. Representative polyols used in preparing the ester lubricants include pentaerythritol, 1,3-butanediol (butylene glycol), 1,4-butanediol, 2,3-butanediol, 2,4-pentanediol, 1,5-pentanediol, 1,6-hexanediol, 2,5-hexanediol, 2-methyl-1,3,-pentanediol, 2-methyl-2,4-pentanediol, 2,3-dimethyl-2,3-butanediol, 2,4-heptanediol, 2,2-diethyl-1,3-propanediol, 2-ethyl-1,3-hexanediol, 2-ethyl-2-n-butyl-1,3-propanediol, and neopentylene glycol (2,2-dimethyl-1,3-propanediol, $HOCH_2C(CH_3)_2CH_2OH$, usually referred to as neopentyl glycol). Especially preferred are butylene glycol and neopentyl glycol. The following example illustrates a typical preparation of a representative ester lubricant of this invention.

EXAMPLE 5

Synthesis of Neopentyl bis -(β-(hexafluorobutoxy)-propionate)

A 1-liter, round-bottom flask, fitted with a thermometer, DeanStarke trap, reflux condenser and Drierite-containing drying tube, is charged with 198 g (0.78 mole) of β-(hexafluorobutoxy)-propionic acid, 36.4 g (0.35 mole) of 2,2-dimethylpropane-1,3-diol (neopentyl glycol), 200 ml distilled toluene, and 3.0 g of p-toluenesulfonic acid monohydrate. After 18 hours of refluxing, 13 ml of water is collected. The reaction mixture is cooled to 15°C, diluted with 300 ml of hexane, and extracted successively with 2 × 300 ml of 10 wt. % aqueous sodium carbonate, and 2 ×100 ml of saturated aqueous sodium chloride. The organic layer is dried over anhydrous sodium sulfate and distilled at reduced pressure to yield 137.6 g (68% conversion) of neopentyl bis -(β-(hexafluorobutoxy)proprionate), of the structure

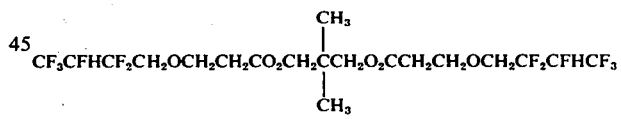

Elemental Analysis: C, 40.03; H, 4.67; F, 39.85%.

Calcd. for $C_{19}H_{24}O_6F_{12}$: C, 39.59; H, 4.20; F, 39.56 %.

Boiling point (uncorrected): 143°–158°C, at 0.045 mm Hg

Index of refraction: $n_D^{24°C}$ 1.3810

Total Acid Number (ASTM: D-664): <0.1 mg KOH/g sample

Kinematic viscosity at 100°F: 22 centistoke.

I claim:

1. A compound of the fomula

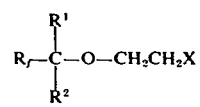

wherein $R_f$ is $CF_3$, $CF_3CFHCF_2$, or $H(CF_2CF_2)_n$ where $n$ is an integer of 1 to 3; $R^1$ and $R^2$ are independently hydrogen or $CH_3$; and X represents $$\overset{O}{\underset{}{\|}}{COH}, \text{ or } \overset{O}{\underset{}{\|}}{COR^3}$$

where $R^3$ is alkyl or alkylene having 1 to 8 carbon atoms.

2. A compound according to claim 1 wherein $R_f$ is $CF_3CFHCF_2$ and $R^1$ and $R^2$ are each hydrogen.

3. A compound according to claim 2 wherein X is COOH.

4. A compound according to claim 1 wherein $R_f$ is $CF_3CFHCF_2$ and $R^1$ and $R^2$ are each $CH_3$.

5. A compound according to claim 4 wherein X is COOH.

6. An ester of an aliphatic polyol having 4 to 10 carbon atoms and 2 to 4 hydroxy groups and an acid of the formula $$R_f-\overset{R^1}{\underset{R^2}{\overset{|}{\underset{|}{C}}}}-O-CH_2CH_2COOH$$

wherein $R_f$ is $CF_3$, $CF_3CFHCF_2$, or $H(CF_2CF_2)_n$ where $n$ is an integer of 1 to 3, and $R^1$ and $R^2$ are independently hydrogen or $CH_3$.

7. An ester according to claim 6 wherein the polyol is a glycol.

8. An ester according to claim 7 wherein $R_f$ if $CF_3CFHCF_2$ and the glycol is neopentyl glycol.

9. An ester according to claim 8 of the formula

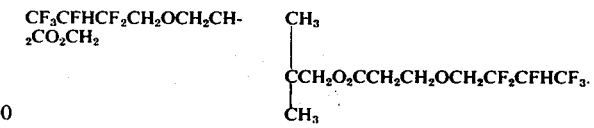

* * * * *